Feb. 2, 1954 — V. Z. WILLIAMS — 2,668,243
INFRARED GAS ANALYZER
Filed Nov. 26, 1949 — 2 Sheets-Sheet 1
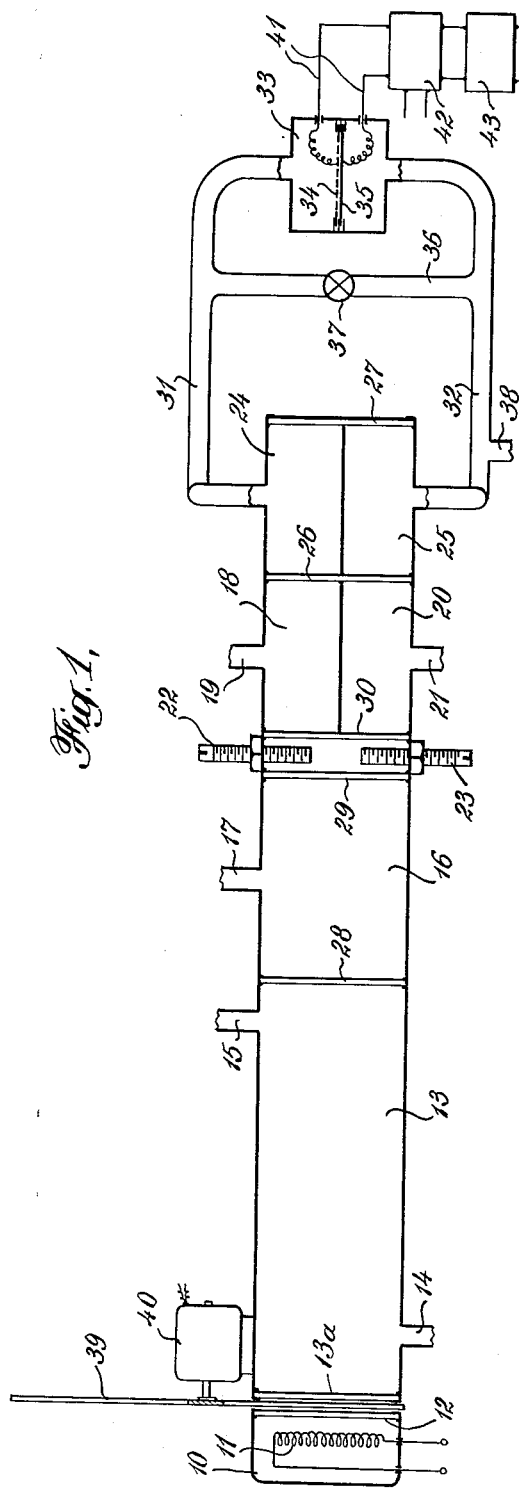
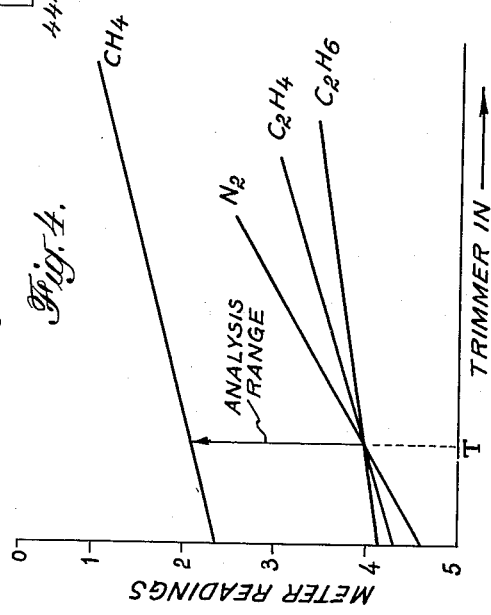
Fig. 4.
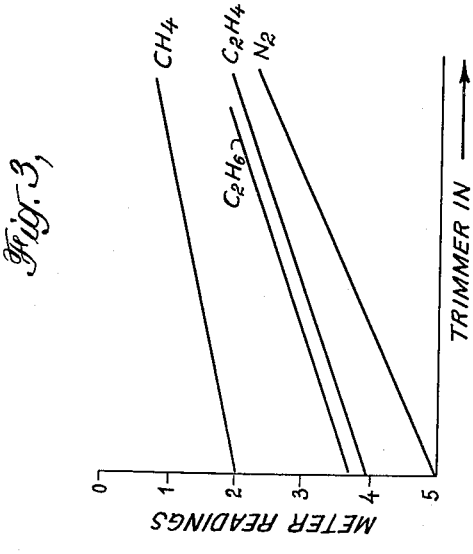
Fig. 3.
INVENTOR.
Van Zandt Williams
BY
Pennie Edmonds Morton & Barrows
ATTORNEYS

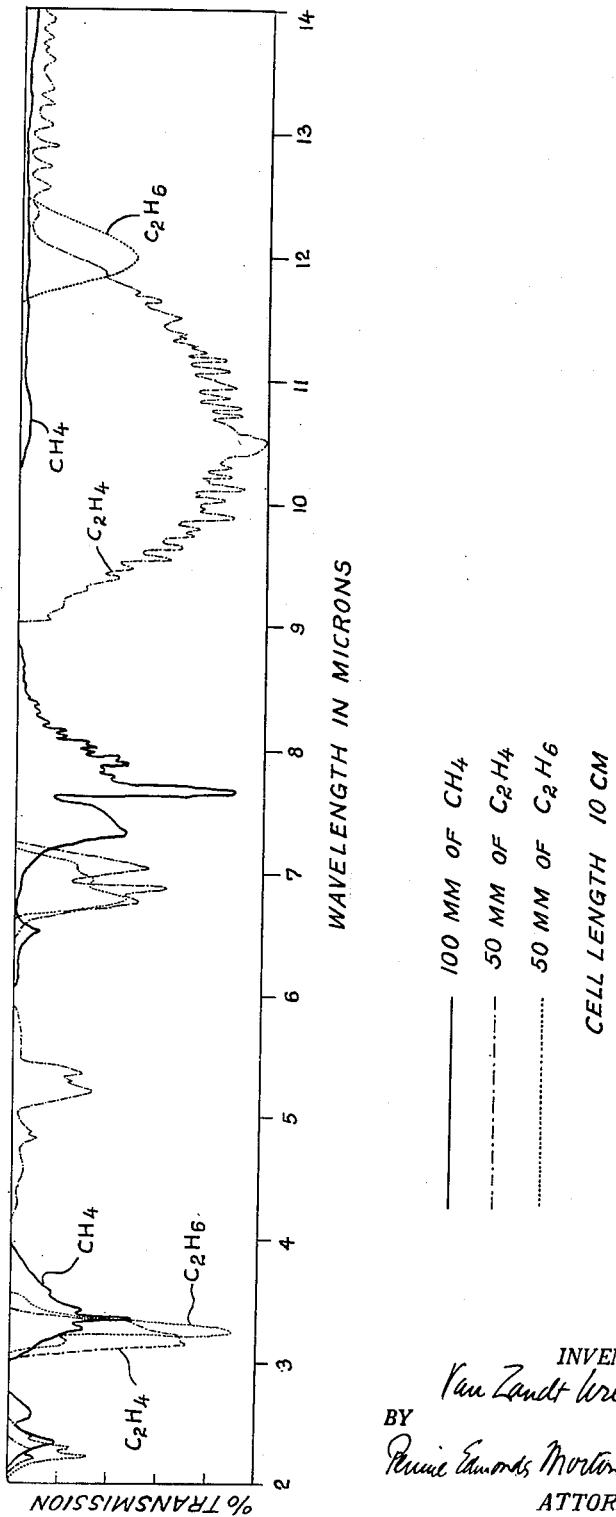

UNITED STATES PATENT OFFICE 2,668,243

INFRARED GAS ANALYZER

Van Zandt Williams, Old Greenwich, Conn., assignor to The Perkin-Elmer Corporation, Glenbrook, Conn., a corporation of New York Application November 26, 1949, Serial No. 129,603

9 Claims. (Cl. 250—43.5)

This invention relates to the analysis of gas mixtures by means of infrared radiation. More particularly, the invention is concerned with a novel apparatus for the infrared analysis of gases and with a method, in the practice of which the apparatus may be employed for determining the amount of a heteratomic gas (referred to hereafter as the "gas of interest") present in a mixture containing at least one other component (referred to hereafter as the "interfering component"), which has a spectral range of absorption of radiation in common with that of the gas of interest.

The gas analyzers so far developed are of two general kinds, commonly referred to as the positive filter type and the negative filter type. In the usual form of the positive type instrument, radiation from the infrared source is formed into two collimated beams, one of which passes successively through a cell containing the sample to be analyzed, a filter cell, and a detector chamber filled with the gas of interest. The other beam passes successively through a dummy cell similar to the sample cell, the filter cell, and a detector chamber similar to the first and also containing the gas of interest. The detectors are connected by a passage closed by a flexible diaphragm, and, if the gas of interest is present in the sample, it absorbs energy from the beam which passes through the first detector chamber. The gas in that detector chamber then cools and the resultant diaphragm movement is a measure of the amount of the gas of interest present in the sample. If another gas having an infrared absorption frequency in common with the gas of interest is present in the sample, the filter cell can be filled with the interfering gas with a view to making both detector chambers insensitive to the characteristic absorption frequencies of the interfering gas. However, this method of nullifying the effect of the interfering gas is not satisfactory when that gas is present in a substantial amount in the sample or has an extensive absorption in common with the gas of interest.

In the negative type of analyzer, the radiation from the source is again formed into two collimated beams, both of which pass through a sample cell and a filter cell. The beams then pass through separate sensitizer cells and fall upon respective detectors, which may be thermopiles. One of the sensitizer cells is filled with the gas of interest and the other with an infrared inert gas and, if the sample contains the gas of interest, the detector behind the sensitizer cell containing the inert gas will cool. The differential cooling of the detectors is a measure of the amount of the gas of interest present in the sample and, since both beams pass through the sample, any other non-interfering gas in the sample will affect both detectors equally and produce no net change. The effect of an interfering gas may be reduced by introduction of such gas into the filter cell, but the use of the filter cell in this manner is not wholly satisfactory for the reasons set forth above.

Of the two types of gas analyzer described, the positive type is selective and permits direct measurement of the energy representing the gas of interest while the negative type measures the difference between two large signals. With the positive type, A. C. operation of the measuring means is possible and this permits relatively non-critical optical focusing, whereas A. C. operation with the negative type requires the use of detectors of small heat capacity and, therefore, critical focusing, which is undesirable in an instrument for plant use. In the positive type, the beams pass through the detector chambers and are thus available for further use while, in the negative type, the beams are stopped by the detectors and the instrument is limited to the determination of a single component. Both types are of limited utility in the analysis of gas mixtures containing components of overlapping absorption, the limitations on the use of the positive type instrument arising principally from the difficulty of eliminating the effect of overlapping components and the limitations on the use of the negative type resulting from the necessity of measuring the difference between two large signals and of employing D. C.

The present invention is directed to the provision of a novel gas analyzer embodying desirable features of both former types of instrument, and of a method, which may be practiced with the new analyzer in determining the amount of a gas of interest in a mixture containing at least one other component, which has infrared absorption overlapping that of the gas of interest throughout a large part of the spectrum. The new instrument includes a pair of detector chambers selective of the energy absorbed, a sample cell lying in the path of infrared radiations passing from the source to both chambers, and a compensator cell and a sensitizer cell lying between the sample cell and respective detector chambers. An adjustable trimmer is mounted in the path of the radiation passing from the sample cell to the compensator cell, and a filter cell may be mounted, if desired, between the sample cell and the compensator and sensitizer cells.

In the operation of the instrument in accordance with the method for the analysis of a gas mixture, for example, which contains two components, other than the gas of interest, having substantial infrared absorption overlapping that of the gas of interest, the detector chambers are filled with a mixture made up of partial pressures of the gas of interest and of the overlapping components. The sensitizer cell is filled with the gas of interest at atmospheric pressure and the compensator cell is filled with an infrared inert gas, although, for some purposes, the compensator cell may contain partial pressures of the overlapping components. With the cells filled as described, the trimmer in front of the compensator cell is adjusted and the partial pressures of the overlapping components in the detector chambers varied, until a set of conditions is reached, at which introduction into the sample cell of either of the components, other than the gas of interest, produces equal cooling of the contents of the detector chambers. When the apparatus is in this condition, it is insensitive to any of the components except the gas of interest and any differential cooling of the contents of the detector chambers is a measure of the amount of the gas of interest present in the sample.

For a better understanding of the invention, reference may be made to the accompanying drawings, in which:

Fig. 1 is a diagrammatic longitudinal sectional view of the new instrument;

Fig. 2 is a graph of the infrared absorption spectra of three gases present in specified amounts in a typical gas mixture which may be analyzed by the instrument; and Figs. 3 and 4 are graphs illustrating the manner in which the instrument is adjusted for the analysis of the typical gas mixture.

The instrument illustrated in the drawings comprises a draft-tight housing 10 containing a source 11 of infrared radiation, the source being any of those commonly used for the purpose. At one side, the housing is closed by a window 12 transmitting infrared radiation and beyond the window lies a cell 13 having an inlet 14 for the sample to be analyzed and an outlet 15 for the sample. A filter cell 16 having an inlet 17 lies beyond the sample cell, the two cells being of the same cross-sectional area. A compensator cell 18 having an inlet 19 and a sensitizer cell 20 having an inlet 21 lie side by side beyond the filter cell 16, so that each of the compensator and sensitizer cells receives part of the radiation, that has passed through the sample and filter cells. A pair of trimmers 22, 23 are mounted adjustably between the filter cell and the compensator and sensitizer cells, respectively, and the trimmers may be moved in and out to vary the amount of radiation entering the detector chambers 24, 25, which lie beyond the compensator and sensitizer cells, respectively. The end walls 26, 27 of the detector chambers and the end walls 13a, 28, 29, and 30 of the several cells are of infrared transmitting material.

The detector chambers 24, 25 are connected by respective tubes 31, 32 to a chamber 33 on opposite sides of a partition subdividing the chamber and formed by an electrical condenser consisting of a stationary perforate plate 34 and a distensible imperforate plate 35. Tubes 31, 32 are connected by a tube 36 containing a valve 37, which can be opened to equalize the initial pressure in the detector chambers but is normally used to provide a small leak to maintain pressure equivalents under long term ambient temperature changes in the detector assembly. Tube 32 is provided with an inlet for admission of gas to the detector chambers.

The radiation from the source passing to the sample cell 13 is interrupted by a light chopper 39, which may take the form of a semi-circular opaque plate and is rotated at a low frequency of the order of five to fifteen cycles by motor 40. The condenser plates 34, 35 are in circuit through leads 41 with the input side of an amplifier 42, which may be a standard electrometer tube amplifier, and, during the operation of the instrument, potential is maintained across the plates. The output of the amplifier is connected to a rectifier 43 operating in synchronism with the chopper 39. The chopper, amplifier, and rectifier may be of the type disclosed in Liston Patent 2,442,298, issued May 25, 1948. The output of the rectifier is passed to a standard D. C. meter 44 or recording potentiometer.

The operation of the new analyzer in accordance with the method of the invention may best be understood by considering the infrared analysis of a typical process stream of gases containing the approximate partial pressures of 100 mm. of $CH_4$, 50 mm. of $C_2H_6$, and 50 mm. of $C_2H_4$, the other components of the stream being molecules, such as $H_2$, $N_2$ or $O_2$, which do not absorb infrared radiation. The infrared absorption spectra of the components $CH_4$, $C_2H_6$ and $C_2H_4$ at the partial pressures stated are shown in Fig. 2, in which it will be seen that the absorption bands of the three gases overlap at about 2.3, 3.3, and 7 microns. If an attempt were made to employ a conventional positive type analyzer to analyze such a process stream for $CH_4$ present in partial pressures from 0 to 100 mm., the detector chambers of that instrument would be filled with $CH_4$ at atmospheric pressure and the sample would be placed in one beam only. Under such conditions, the instrument would be sensitive to $C_2H_6$ and $C_2H_4$, because of the overlap of the absorption bands of those gases with the bands of the gas of interest in the regions above stated. Introduction into both beams of a filter cell containing $C_2H_6$ and $C_2H_4$ could be used to reduce the effect of those gases but, at 2.3 microns, the wave length of high energy from the source, or at 3.3 microns, the effect of the interfering gases could not be eliminated with a reasonable filter cell length. Accordingly, variations in $C_2H_6$ or $C_2H_4$ in the sample would result in variations in the absorption in the regions mentioned and produce errors in reading. Similar results would be obtained with a conventional negative type instrument.

The graph, Fig. 3, represents results obtained by employing the new instrument as follows. The detector chambers 24, 25 and the sensitizer cell 20 are filled with $CH_4$ to atmospheric pressure, the sample cell 13 and the compensator cell 18 are filled with a non-absorbing gas, such as $N_2$, and both trimmers 22, 23 are backed out of the beam. The meter reading is then noted, after which trimmer 22 is introduced into the beam in successive steps and a reading taken at each step. When the readings are plotted as a graph with meter readings as ordinates and trimmer positions as abscissae, the curve $N_2$ in Fig. 3 is obtained. With the detector chambers and the sensitizer cell filled as before, the same readings are obtained with the sample cell filled successively with 100 mm. of $CH_4$ (the top of the range expected in the stream to be analyzed), 760 mm. of $C_2H_4$, and 760 mm. of $C_2H_6$. The fillings of the sample cell with $C_2H_4$ and $C_2H_6$ are at atmospheric pressure, since these are interfering gases and a convenient relatively large pressure is used in order to determine the conditions for best minimization of interference. The readings for $CH_4$, $C_2H_4$, and $C_2H_6$ are then plotted for comparison with the $N_2$ curve.

An inspection of Fig. 3 shows that no analysis of the stream for $CH_4$ can be made with the instrument used as described. However, if some of the $CH_4$ in the detector chambers 24, 25 is replaced by empirically determined partial pressures of $C_2H_4$ and $C_2H_6$, the ordinate values of the $N_2$, $C_2H_4$, and $C_2H_6$ at zero and full trimming can be fixed, so that the curves intersect at a common point, as shown in Fig. 4. The partial pressures of the interfering gases employed in the detector chambers to achieve the desired result would be relatively small and ordinarily within the range of 40–100 mm. for the $C_2H_6$ and of 20–50 mm. for the $C_2H_4$. The $C_2H_6$ is required at greater pressure because of the greater overlap of its absorption bands with those of $CH_4$. At the point where the $C_2H_4$ and $C_2H_6$ curves cross the $N_2$ curve, the contents of the two detector chambers are cooled equally by $C_2H_4$ and $C_2H_6$ in the sample, so that, in this condition of the instrument, it is sensitive only to $CH_4$, the analysis range for which is indicated by the arrow on Fig. 4.

In general, in carrying out the new method, the partial pressure of the gas of interest present in the detector chambers will depend on the absorptivity of the gas with respect to infrared radiation and the partial pressures of the other infrared absorbing gases used in the detector chambers will depend upon their degree of spectral overlap with the gas of interest. In the example given, the $CH_4$ is a weak absorber of infrared radiation at its unique absorption wave lengths and, in the gas mixture in the detector chambers, the partial pressure of the $CH_4$ is, accordingly, greatly in excess of the partial pressures of the $C_2H_4$ and $C_2H_6$. If the gas of interest were a strong absorber at its unique wave lengths, as, for example, $CO_2$, it would be employed in the detector chambers at a much lower partial pressure.

The new instrument offers the advantages that it is selective, involves the use of smaller amounts of energy to obtain off balance signals than are employed in the conventional negative type instrument, and is adapted for A. C. operation. In addition, the beam is not stopped at the detector chambers and is thus available for use in analysis for other components of the sample.

In the use of the instrument as described, the compensator cell 18 is filled with a non-absorbing gas, but, for some purposes, it may be desirable to fill it with partial pressures of $C_2H_4$ and $C_2H_6$ in order to make the instrument insensitive to these gases. The use of partial pressures of the interfering gases in the compensator cell reduces the radiation at certain wave lengths that reaches the detector chamber behind the cell, and the action is similar to that of trimmer 22 at those wave lengths.

As shown in Fig. 4, the method of compensation for interfering components disclosed provides a cross-over point at an overall unbalanced energy condition in the detectors. This cross-over point may vary on the ordinate scale because of variations in the source temperature, even though conditions in the sample cell are constant. If such a condition proves undesirable, the cross-over point on the ordinate scale can be shifted to a zero value representing complete energy balance by the use of a third beam of radiation from the source, which is properly interrupted by the chopper, by-passes the sample, filter, sensitizer, and compensator cells and enters detector chamber 25 in the apparatus shown. The amount of radiant energy thus introduced into chamber 25 is then adjusted to shift the ordinate scale of Fig. 4, until the cross-over point reaches the zero value.

In the new instrument, the elements of the apparatus are placed close together and the inner surfaces of the cells are reflecting. Although the cells, chopper, and trimmers have been described as arranged in a particular sequence between the source and detector chambers, variations in the arrangement are permissible, as, for example, the positions of the sample and filter cells may be interchanged. Also, the chopper may be placed anywhere in the train between the source and detector chambers, its insertion between the sensitizer-compensator cell unit and the detector chambers being permissible because its small size produces little separation. If focused optics are employed, any arrangement of the elements of the apparatus may be used, except, of course, that the source should come first and the detector chambers last. With internal reflecting funnel optics, the sensitizer-compensator cell unit, the trimmers, and the detector chambers, should be adjacent to one another.

I claim:

1. An apparatus for determining the amount of a gas of interest present in a mixture containing at least one component having a spectral range of absorption of radiation in common with that of the gas of interest, which comprises a source of radiation, a pair of detector chambers in the path of radiation from the source and containing equal amounts of a mixture comprising partial pressures of the gas of interest and of the interfering component, a cell containing a sample of the mixture to be examined and in the path of radiation from the source to both detector chambers, a compensator cell and a sensitizer cell in the path of radiation from the source to respective detector chambers, the sensitizer cell containing the gas of interest and the compensator cell containing an inert gas, means for passing such a quantity of radiation from the source to the detector chamber beyond the compensator cell that components other than the gas of interest in the mixture in the sample cell produce equal temperature effects in the contents of the detector chambers, and measuring means responsive to the differences in temperature rise of the gases in the two detector chambers.

2. An apparatus for determining the amount of a gas of interest present in a mixture containing at least one component having a spectral range of absorption of radiation in common with that of the gas of interest, which comprises a source of radiation, a pair of detector chambers in the path of radiation from the source and containing equal amounts of a mixture comprising partial pressures of the gas of interest and of the interfering component, a cell containing a sample of the mixture to be examined and in the path of radiation from the source to both detector chambers, a compensator cell and a sensitizer cell in the path of radiation from the source to respective detector chambers, the sensitizer cell containing the gas of interest and the compensator cell containing the interfering component, means for passing such a quantity of radiation from the source to the detector chamber beyond the compensator cell that components other than the gas of interest in the mixture in the sample cell produce equal temperature effects in the contents of the detector chambers, and measuring means responsive to the differences in temperature rise of the gases in the two detector chambers.

3. An apparatus for determining the amount of a gas of interest present in a mixture containing at least one component having a spectral range of absorption of radiation in common with that of the gas of interest, which comprises a source of radiation, a pair of detector chambers in the path of radiation from the source and containing equal amounts of a mixture comprising partial pressures of the gas of interest and of the interfering component, a cell containing a sample of the mixture to be examined and in the path of radiation from the source to both detector chambers, a compensator cell and a sensitizer cell in the path of radiation from the source to respective detector chambers, the sensitizer cell containing the gas of interest and the compensator cell containing an inert gas, means for passing such a quantity of radiation from the source to the detector chamber beyond the compensator cell that components other than the gas of interest in the mixture in the sample cell produce equal temperature effects in the contents of the detector chambers, means for periodically interrupting the radiation between the source and the detector chambers, and measuring means responsive to the difference in temperature rise of the gases in the two detector chambers.

4. An apparatus for determining the amount of a gas of interest present in a mixture containing at least one component having a spectral range of absorption of radiation in common with that of the gas of interest, which comprises a source of radiation, a pair of detector chambers in the path of radiation from the source and containing equal amounts of a mixture comprising partial pressures of the gas of interest and of the interfering component, a cell containing a sample of the mixture to be examined and in the path of radiation from the source to both detector chambers, a compensator cell and a sensitizer cell in the path of radiation from the source to respective detector chambers, the sensitizer cell containing the gas of interest and the compensator cell containing an inert gas, adjustable trimming means for passing such a quantity of radiation from the source to the detector chamber beyond the compensator cell that components other than the gas of interest in the mixture in the sample cell produce equal temperature effects in the contents of the detector chambers, and measuring means responsive to the differences in temperature rise of the gases in the two detector chambers.

5. A method for determining the amount of a gas of interest present in a mixture containing at least one component having a spectral range of absorption of radiation in common with that of the gas of interest, which comprises passing radiation from a source simultaneously into a pair of like detector chambers containing equal pressures of a mixture made up of partial pressures of the gas of interest and of the interfering component, interposing between the source and one detector chamber a quantity of the gas of interest, varying the quantity of radiation passing to the second detector chamber and the amount of the interfering component present in the detectors, until the components other than the gas of interest present in a sample of the mixture interposed in the radiation from the source entering the two detector chambers will bring about equal temperature effects in the contents of the detector chambers, and, while maintaining the contents of the detector chambers unchanged, interposing a sample of the mixture to be examined in the radiation passing to both detectors and measuring the differential temperature effects in the contents of the detector chambers resulting from the gas of interest in the sample.

6. A method of determining the amount of a gas of interest present in a mixture containing components having respective spectral ranges of absorption of radiation in common with that of the gas of interest, which comprises passing radiation from a source simultaneously into a pair of detector chambers containing equal pressures of a mixture made up of partial pressures of the gas of interest and of the interfering components, interposing between the source and one detector chamber a quantity of the gas of interest, varying the quantity of radiation passing to the second detector chamber and the amount of the interfering components present in the detectors, until the components other than the gas of interest present in a sample of the mixture interposed in the radiation from the source entering the two detector chambers will bring about equal temperature effects in the contents of the detector chambers, and, while maintaining the contents of the detector chambers unchanged, interposing a sample of the mixture to be examined in the radiation passing to both detectors and measuring the differential temperature effects in the contents of the detector chambers resulting from the gas of interest in the sample.

7. A method for determining the amount of a gas of interest present in a mixture containing at least one component having a spectral range of absorption of radiation in common with that of the gas of interest, which comprises passing radiation from a source simultaneously into a pair of like detector chambers containing equal pressures of a mixture made up of partial pressures of the gas of interest and of the interfering component, interposing between the source and one detector chamber a quantity of the gas of interest, varying the quantity of radiation passing to the second detector chamber and the amount of the interfering component present in the detectors, until the components other than the gas of interest present in a sample of the mixture interposed in the radiation from the source entering the two detector chambers will bring about equal temperature effects in the contents of the detector chambers, and, while maintaining the contents of the detector chambers unchanged, passing the mixture to be examined across the radiation passing from the source to both detectors and measuring the differential temperature effects in the contents of the detector chambers resulting from the gas of interest in the sample.

8. A method for determining the amount of a gas of interest present in a mixture containing at least one component having a spectral range of absorption of radiation in common with that of the gas of interest, which comprises passing radiation from a source simultaneously into a pair of like detector chambers containing the same mixture at atmospheric pressure made up of partial pressures of the gas of interest and of the interfering component, interposing between the source and one detector chamber a quantity of the gas of interest, varying the quantity of radiation passing to the second detector chamber and the amount of the interfering component present in the detectors, until the components other than the gas of interest present in a sample of the mixture interposed in the radiation from the source entering the two detector chambers will bring about equal temperature effects in the contents of the detector chambers unchanged, interposing a sample of the mixture to be examined in the radiation passing to both detectors and measuring the differential temperature effects in the contents of the detector chambers resulting from the gas of interest in the sample.

9. A method for determining the amount of a gas of interest present in a mixture containing at least one component having a spectral range of absorption of radiation in common with that of the gas of interest, which comprises passing radiation from a source simultaneously into a pair of like detector chambers containing equal pressures of a mixture made up of partial pressures of the gas of interest and of the interfering component periodically interrupting the radiation from the source, interposing between the source and one detector chamber a quantity of the gas of interest, varying the quantity of radiation passing to the second detector chamber and the amount of the interfering component present in the detectors, until the components other than the gas of interest present in a sample of the mixture interposed in the radiation from the source entering the two detector chambers will bring about equal temperature effects in the contents of the detector chambers, and, while maintaining the contents of the detector chambers unchanged, interposing a sample of the mixture to be examined in the radiation passing to both detectors and measuring the periodic differential temperature effects in the contents of the detectors resulting from variations in the amount of gas of interest in the sample.

VAN ZANDT WILLIAMS.

References Cited in the file of this patent

UNITED STATES PATENTS

| Number | Name | Date |
|---|---|---|
| 2,170,435 | Sweeney | Aug. 22, 1939 |
| 2,404,064 | Heigl et al. | July 16, 1946 |
| 2,431,019 | Barnes | Nov. 18, 1947 |
| 2,442,298 | Liston | May 25, 1948 |
| 2,443,427 | Kidder et al. | June 15, 1948 |
| 2,451,572 | Moore | Oct. 19, 1948 |
| 2,555,327 | Elliott | June 5, 1951 |

OTHER REFERENCES

Journal of Scientific Instruments, Dec. 1946, page 293.

An Optical Acoustic Method of Gas Analysis, by F. I. Callisen, Nature, Feb. 1, 1947, page 167.

Infra-Red Instrumentalities and Techniques by V. Z. Williams, Review of Scientific Instruments, Mar. 1948, page 176 and 177.